United States Patent
Lee et al.

(10) Patent No.: US 10,275,122 B2
(45) Date of Patent: *Apr. 30, 2019

(54) SEMANTIC CARD VIEW

(71) Applicant: Microsoft Technology Licensing, LLC, Redmond, WA (US)

(72) Inventors: Hae Jin Lee, Seattle, WA (US); Daniel Dole, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/817,880

(22) Filed: Nov. 20, 2017

(65) Prior Publication Data

US 2018/0074666 A1 Mar. 15, 2018

Related U.S. Application Data

(63) Continuation of application No. 15/096,448, filed on Apr. 12, 2016, now Pat. No. 9,836,187, which is a (Continued)

(51) Int. Cl.
*G06K 5/00* (2006.01)
*G06F 3/0482* (2013.01)
(Continued)

(52) U.S. Cl.
CPC .......... *G06F 3/0482* (2013.01); *G06F 3/0483* (2013.01); *G06F 3/04842* (2013.01);
(Continued)

(58) Field of Classification Search
CPC ............... G06F 17/30241; G06F 3/041; G06F 3/04842; G06F 17/30; G06F 17/30017;
(Continued)

(56) References Cited

U.S. PATENT DOCUMENTS 5,479,528 A * 12/1995 Speeter ................... G06F 3/033
382/115
5,613,032 A * 3/1997 Cruz .................. H04N 7/17318
348/E7.071
(Continued)

OTHER PUBLICATIONS

"Why Cards are the Future of the Web", Retrieved From: https://blog.intercom.io/why-cards-are-the-future-of-the-web/, Sep. 6, 2013, 16 Pages.
(Continued)

*Primary Examiner* — Thien M Le

(57) ABSTRACT

Architecture that enables a card interaction model that can present cards in different ways. When a user performs tasks, new stacked cards (one card on top of another card) corresponding to those tasks open in a left pane over the top of a background canvas (a card overlay of the underlying canvas). Users can scroll through the card stack of the card overlay to retrieve previous cards. Additionally, in an alternative viewing mode, a user can interact with the card overlay via an interactive affordance (an interactive object made available to facilitate a potential action) to enable viewing (e.g., an overview) of the cards in a side-by-side card overlay manner to further enable the opening and quick navigation to one of the previous cards. The architecture has applicability to mapping systems where searches range over many different geographical sites.

20 Claims, 6 Drawing Sheets

Related U.S. Application Data continuation of application No. 14/474,480, filed on Sep. 2, 2014, now Pat. No. 9,342,227.

(51) Int. Cl.
*G06F 3/0484* (2013.01)
*G06F 3/0483* (2013.01)
*G06F 17/30* (2006.01)

(52) U.S. Cl.
CPC ...... *G06F 3/04845* (2013.01); *G06F 3/04847* (2013.01); *G06F 17/30528* (2013.01); *G06F 17/30551* (2013.01); *G06F 17/30598* (2013.01)

(58) Field of Classification Search
CPC ......... G06F 17/30041; G06F 17/30061; G06F 17/3087; G06F 2203/04809; G06F 3/0238; G06F 3/033; G06F 3/0414; G06F 3/04847; G06F 3/04886; G06F 3/0482; H04N 21/4821; H04N 21/41407; H04N 21/4312; H04N 21/4622; H04N 21/47202; H04N 21/47214; H04N 21/47217; H04N 21/812; H04N 5/44543
USPC ........................................ 235/380
See application file for complete search history.

(56) References Cited

U.S. PATENT DOCUMENTS

| | | | |
|---|---|---|---|
| 6,874,683 B2* | 4/2005 | Keronen | G06F 3/0238 235/380 |
| 8,209,629 B2 | 6/2012 | Laurie et al. | |
| 8,458,540 B2 | 6/2013 | Inagawa | |
| 8,482,540 B1* | 7/2013 | Reeves | G06F 1/1662 345/156 |
| 9,292,840 B1 | 3/2016 | Velline et al. | |
| 9,342,227 B2 | 5/2016 | Lee et al. | |
| 9,836,187 B2 | 12/2017 | Lee et al. | |
| 2003/0023554 A1 | 1/2003 | Yap et al. | |
| 2003/0191713 A1 | 10/2003 | Yap et al. | |
| 2004/0117358 A1 | 6/2004 | von kaenel et al. | |
| 2006/0174209 A1 | 8/2006 | Barros | |
| 2009/0064057 A1 | 3/2009 | Bull et al. | |
| 2010/0153386 A1* | 6/2010 | Tysowski | G06F 17/30041 707/736 |
| 2010/0176194 A1 | 7/2010 | Hodgkinson et al. | |
| 2011/0086618 A1 | 4/2011 | Degrazia et al. | |
| 2011/0231878 A1* | 9/2011 | Hunter | H04N 5/44543 725/48 |
| 2012/0198497 A1 | 8/2012 | Chan | |
| 2012/0290680 A1* | 11/2012 | Hwang | H04M 1/7253 709/217 |
| 2013/0073388 A1 | 3/2013 | Heath | |
| 2013/0286038 A1 | 10/2013 | Kamath et al. | |
| 2014/0026088 A1 | 1/2014 | Monte | |
| 2014/0200806 A1* | 7/2014 | Carnevali | G01C 21/203 701/533 |
| 2014/0215330 A1* | 7/2014 | Lee | G09B 29/007 715/703 |
| 2014/0223334 A1 | 8/2014 | Jensen et al. | |
| 2014/0223335 A1 | 8/2014 | Pearson | |
| 2015/0350005 A1* | 12/2015 | Singh | G06F 3/0481 709/206 |
| 2016/0224197 A1 | 4/2016 | Lee et al. | |

OTHER PUBLICATIONS

"Non-Final Office Action Issued in U.S. Appl. No. 14/474,480", dated Jun. 2, 2015, 12 Pages.

"Non-Final Office Action Issued in U.S. Appl. No. 15/096,448", dated Jan. 25, 2017, 15 Pages.

"Office Action Issued in European Patent Application No. 15762853.8", dated Jul. 26, 2018, 8 Pages.

Choy, Tony, "Preparing Your Business for the New Google Maps", Retrieved From: http://www.searchenginepeople.com/blog/preparing-your-business-for-the-new-google-maps.html, Jul. 18, 2013, 5 Pages.

Lovin, Brian, "Design Details: Paper by Facebook", Retrieved From: https://web.archive.org/web/20140208020649/ http://blog.brianlovin.com/design-details-paper-by-facebook, Feb. 2014, 26 Pages.

"International Preliminary Report on Patentability Issued in PCT Application No. PCT/US2015/046840", dated Nov. 9, 2016, 9 Pages.

"International Search Report and Written Opinion Issued in PCT Application No. PCT/US2015/046840", dated Nov. 26, 2015, 12 Pages.

"Second Written Opinion Issued in PCT Application No. PCT/US2015/046840", dated Jul. 27, 2016, 8 Pages.

Phillips, Laura, "What Is Google Now and Why Should I Use It", Retrieved From: https://www.koozai.com/blog/news/industry-news/what-is-google-now-2/, Apr. 8, 2013, 7 Pages.

Ritchie, Rene, "iOS 6: Is it time for Apple to Revamp the Multitasking Fast App Switcher", Retrieved From: http://www.imore.com/ios-6-multitasking-fast-app-switcher, May 29, 2012, 28 Pages.

Vladimir, Michl, "The Autodesk 360 cloud—what's next", Retrieved From: http://budweiser.cadstudio.cz/2014/05/the-autodesk-360-cloud-whats-next.html, May 22, 2014, 14 Pages.

* cited by examiner

SEMANTIC CARD VIEW

RELATED CASES

The present application is a continuation of U.S. patent application Ser. No. 15/096,448, filed Apr. 12, 2016, entitled "Semantic Card View," which is now U.S. patent application Ser. No. 9,836,187, which is a continuation of U.S. patent application Ser. No. 14/474,480, filed Sep. 2, 2014, entitled "Semantic Card View," which is now U.S. Pat. No. 9,342,227, all of which are hereby incorporated by reference.

BACKGROUND

As users become increasingly more familiar and efficient in the interaction with programs and devices, inefficiencies in the programs and devices then begin to impact the overall user experience. Such negative impacts can be readily expressed on the Internet by way of blogs, for example, thereby potentially reducing sales. Thus, vendors are becoming more sensitive to user feedback and attempt to react to such criticisms by implementing updates quickly. For example, the user experience can be impacted simply by the changing of the view of the user interface or not enabling a view in which the desired information is not readily available.

SUMMARY

The following presents a simplified summary in order to provide a basic understanding of some novel implementations described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture enables a card interaction model that can present cards in different ways. When a user performs tasks, new stacked cards (one card on top of another card) corresponding to those tasks open in a left pane over the top of a background canvas (a card overlay of the underlying canvas). Users can scroll through the card stack of the card overlay to retrieve previous cards. Additionally, in an alternative viewing mode, a user can interact with the card overlay via an interactive affordance (an interactive object made available to facilitate a potential action) to enable viewing (e.g., an overview) of the cards in a side-by-side card overlay manner to further enable the opening and quick navigation to one of the previous cards.

Since the number of cards (cardset) for a given session may be more than can be viewed entirely in a display (or view portal) of a device, the user can scroll through the cardset of side-by-side cards using user input interactions common to the many different types of user interactions such as gestures the include voice communications, touch, gesture recognition, natural language commands, and the like.

As applied to a mapping application, a semantic card interaction model is provided where, when a user performs mapping tasks, new stacked semantic cards corresponding to those mapping tasks open in a left pane card overlay over the top of a background map canvas. Users can scroll through the semantic card stack to retrieve previous semantic cards. Additionally, in an alternative viewing mode, a user can interact with the interactive affordance to enable viewing (e.g., an overview) of the cards in a side-by-side card overlay manner to further enable the opening and quick navigation to one of the previous semantic cards.

Since the number of semantic cards (cardset) for a given session may be more than can be viewed entirely in a display (or view portal) of a device, the user can scroll through the semantic cardset of side-by-side cards of the card overlay using user input interactions common to the many different types of user interactions such as gestures the include voice communications, touch, gesture recognition, natural language commands, and the like.

More specifically, the card view architecture enables users to see an overview of the cards the user has opened and navigate back to any of those cards during a session (e.g., in a maps website). The architecture comprises an affordance to access the card view and the capability to select any card in the view to put that card back into an active/focus state on the map canvas. Selection of a card automatically causes the architecture to facilitate the retrieval and presentation of the associated underlying canvas view. Thus, the user can interact with the affordance to move back to the stacked card overlay view, thereby revealing the underlying canvas view for improved viewing (rather than through portions of the card overlay graphics).

As a general summary of some of the architecture capabilities, the user is enabled to see an overview of the cards currently generated as part of the session and then to quickly navigate to a card generated earlier in the session (e.g., distant in time and/or context from the more recent card in focus). Additionally, the overview enables the expeditious deletion of unwanted cards, provides sufficient cues to accelerate quick identification by the user, the organization (e.g., clustering) of cards of particular types for comparison (e.g., Top Pot Donuts versus Mighty O Donuts), and enables the sharing of the user session with another user and/or system.

The architecture enables cardset minimization while maintaining the relative length as well as the search query on top may accelerate identification by the user. A visual connection between a vertical and horizontal layout is clearly understood by the user and the transition between stacked view and entire view (overview) is seamless. Moreover, the architecture facilitates more efficient and effective use of the display and screen real estate.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
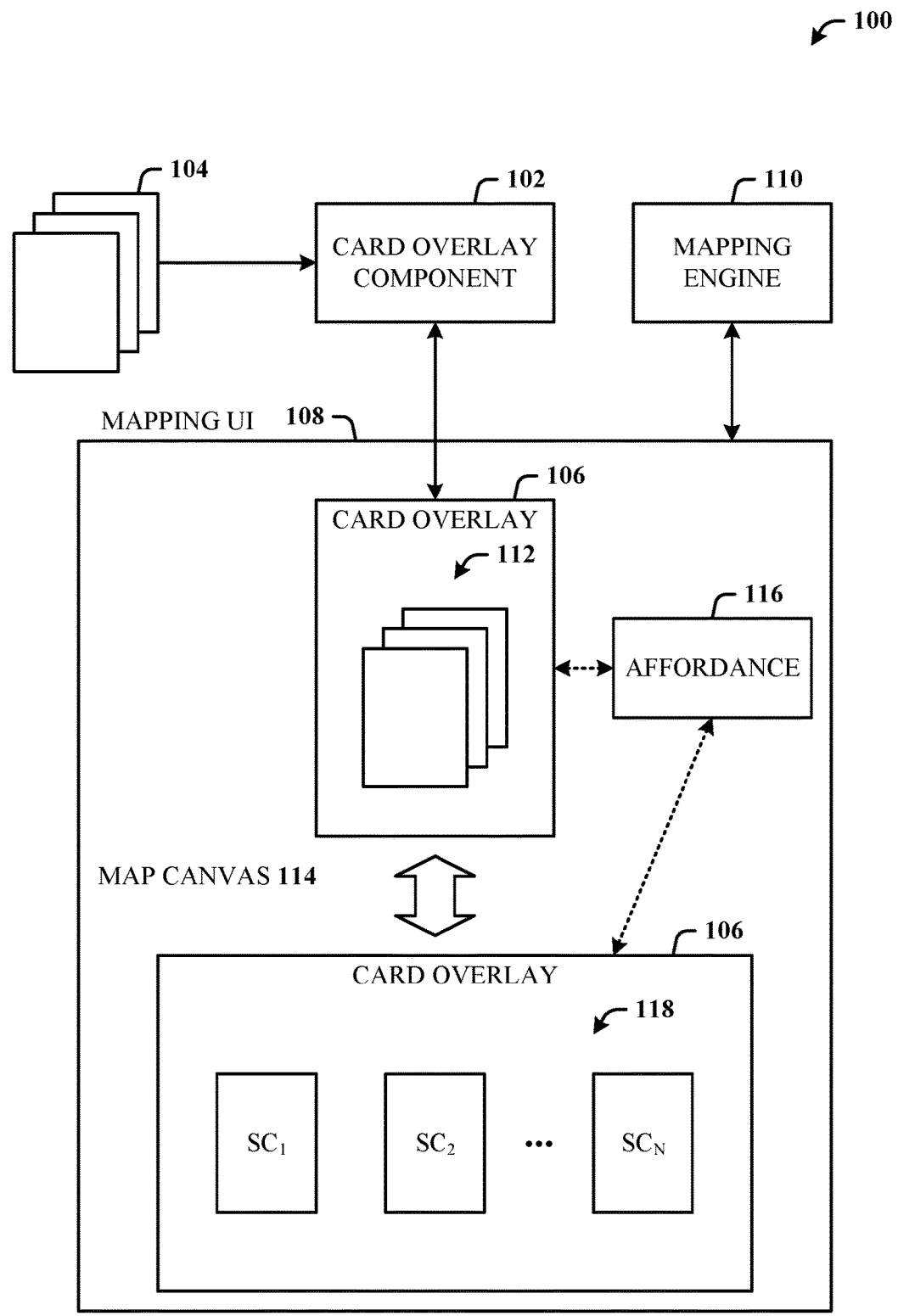
FIG. 1 illustrates a system in accordance with the disclosed architecture.

The disclosed architecture enables a card interaction model that can present cards in different ways. When a user performs tasks, new stacked cards (visually represented as one card on top of another card) corresponding to those tasks open in a left pane over the top of a background canvas (a card overlay of the underlying canvas). Users can scroll through (e.g., like a Rolodex product that enables the rotational viewing of one card at a time) the card stack of the card overlay to retrieve previous cards. Additionally, in an alternative viewing mode, a user can interact with the card overlay to change the view of the card overlay via an interactive affordance (an interactive object made available to facilitate a potential action) to enable viewing of the cards in a side-by-side card overlay manner (e.g., an overview) to further enable the opening and quick navigation to one of the previous cards. In one implementation, the card interaction model can be realized in a hypertext markup language (HTML) program.

Since the number of cards (cardset) for a given session may be more than can be viewed entirely in a display (or view portal) of a device, the user can scroll through the cardset of side-by-side cards using user input interactions common to the many different types of user interactions such as gestures the include voice communications, touch, gesture recognition, natural language commands, and the like.

As applied to a mapping application, a semantic card interaction model is provided where, when a user performs mapping tasks, new stacked semantic cards corresponding to those mapping tasks open in a left pane card overlay over the top of a background map canvas. Users can scroll through the semantic card stack to retrieve previous semantic cards. Additionally, in an alternative viewing mode, a user can interact with the interactive affordance to enable viewing (e.g., an overview) of the cards in a side-by-side card overlay manner to further enable the opening and quick navigation to one of the previous semantic cards.

Since the number of semantic cards (cardset) for a given session may be more than can be viewed entirely in a display (or view portal) of a device, the user can scroll through the semantic cardset of side-by-side cards of the card overlay using user input interactions common to the many different types of user interactions such as gestures the include voice communications, touch, gesture recognition, natural language commands, and the like.

More specifically, the card view architecture enables users to see an overview of the cards the user has opened and navigate back to any of those cards during a session (e.g., in a maps website). The architecture comprises an affordance to access the card view and the capability to select any card in the view to put that card back into an active/focus state on the map canvas. Selection of a card automatically causes the architecture to facilitate the retrieval and presentation of the associated underlying canvas view. Thus, the user can interact with the affordance to move back to the stacked card overlay view, thereby revealing the underlying canvas view for improved viewing (rather than through portions of the card overlay graphics).

As a general summary of some of the architecture capabilities, the user is enabled to see an overview of the cards currently generated as part of the session and then to quickly navigate to a card generated earlier in the session (e.g., distant in time and/or context from the more recent card in focus). Additionally, the overview enables the expeditious deletion of unwanted cards, provides sufficient cues to accelerate quick identification by the user, the organization (e.g., clustering) of cards of particular types for comparison (e.g., Top Pot Donuts versus Mighty O Donuts), and enables the sharing of the user session with another user and/or system.

The architecture enables cardset minimization while maintaining the relative length as well as the search query on top may accelerate identification by the user. A visual connection between a vertical and horizontal layout is clearly understood by the user and the transition between stacked view and entire view (overview) is seamless. Moreover, the architecture facilitates more efficient and effective use of the display and screen real estate.

User interaction with a device, client, and user interface can be gesture-enabled, whereby the user employs one or more gestures for interaction. For example, the gestures can be natural user interface (NUI) gestures. NUI may be defined as any interface technology that enables a user to interact with a device in a "natural" manner, free from artificial constraints imposed by input devices such as mice, keyboards, remote controls, and the like. Examples of NUI methods include those methods that employ gestures, broadly defined herein to include, but not limited to, tactile and non-tactile interfaces such as speech recognition, touch recognition, facial recognition, stylus recognition, air gestures (e.g., hand poses and movements and other body/ appendage motions/poses), head and eye tracking, voice and speech utterances, and machine learning related at least to vision, speech, voice, pose, and touch data, for example.

NUI technologies include, but are not limited to, touch sensitive displays, voice and speech recognition, intention and goal understanding, motion gesture detection using depth cameras (e.g., stereoscopic camera systems, infrared camera systems, color camera systems, and combinations thereof), motion gesture detection using accelerometers/ gyroscopes, facial recognition, 3D displays, head, eye, and gaze tracking, immersive augmented reality and virtual reality systems, all of which provide a more natural user interface, as well as technologies for sensing brain activity using electric field sensing electrodes (e.g., electro-encephalograph (EEG)) and other neuro-biofeedback methods.

Reference is now made to the drawings, wherein like reference numerals are used to refer to like elements throughout. In the following description, for purposes of explanation, numerous specific details are set forth in order to provide a thorough understanding thereof. It may be evident, however, that the novel implementations can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a system 100 in accordance with the disclosed architecture. The system 100 can include a card overlay component 102 configured to present semantic cards 104 in a card overlay 106 of a mapping user interface 108. The semantic cards 104 relate to tasks performed during a session associated with a mapping engine 110. The card overlay 106 has a view 112 and is visually overlayed on a map canvas 114 of the mapping user interface 108.

An interactive affordance 116 is generated in association with the card overlay 106, that when selected enables a different view 118 of the semantic cards 104 in the card overlay 106 of the mapping user interface 108. The semantic cards 104 are represented in the view 112 as a single semantic card and the affordance 116 annotated with a count of the multiple semantic cards 104. The semantic cards 104 are represented in the different view 118 as an overview (spread out and non-overlapping) of individually viewable and selectable semantic cards (e.g., $SC_1$, $SC_2$, ..., $SC_N$). The semantic cards 104 represented in the different view 118 can be arranged according to recency with a most recent semantic card (e.g., $SC_2$) having an applied visual emphasis (e.g., thick line bolded bordering, highlighting, etc.).

The semantic cards 104 as represented in the different view 118 can be arranged by category for comparison. This arranging operation can be user configurable so as to result in automatic grouping of the cards 104 as presented in the different view 118. The categories can include, but are limited to, types of establishments, types of establishment products, based on location, based on popularity, based on reviews, and so on.

The mapping engine 110 changes the map canvas 114 in response to selection of a semantic card (e.g., $SC_2$) of the different view 118. For example, if the semantic card $SC_1$ relates to a particular type of restaurant and the map canvas shows the location and/or directions to that restaurant, user selection of the semantic card $SC_2$ results in the mapping engine 110 changing the map canvas 114 to the geography, street view, aerial view, etc. associated with the semantic card $SC_2$. Thus, by simply selecting a given semantic card, the map canvas 114 changes accordingly.

The card overlay component 102 enables the storage and sharing of the semantic cards generated during the session. The session defines all the semantic cards assigned to that session. Thus, the session of a first user can be shared with a second user, who can then executed the session to see the semantic cards and map canvas experienced by the first user in the session. It can be the case that the second user then appends to the same session to create and updated session, and stores/shares the updated session back to the first user. The user can then see the cards and map canvases of the second user.

The semantic cards 104 of the different view 118 can be individually deleted. This is just one operation on the overview of the cards. For example, the user can drag-and-drop cards to re-arrange the ranking and/or recency arrangement. In one implementation, when the semantic card is deleted, the corresponding map canvas is also deleted. In another implementation, when the semantic card is deleted, the corresponding map canvas is retained for a specific period of time, and from which the card can be regenerated by user interaction with the map canvas, as may be searched and retrieved of the user.

It is to be understood that in the disclosed architecture, certain components may be rearranged, combined, omitted, and additional components may be included. Additionally, in some implementations, all or some of the components are present on the client, while in other implementations some components may reside on a server or are provided by a local or remote service.

Figure 2:
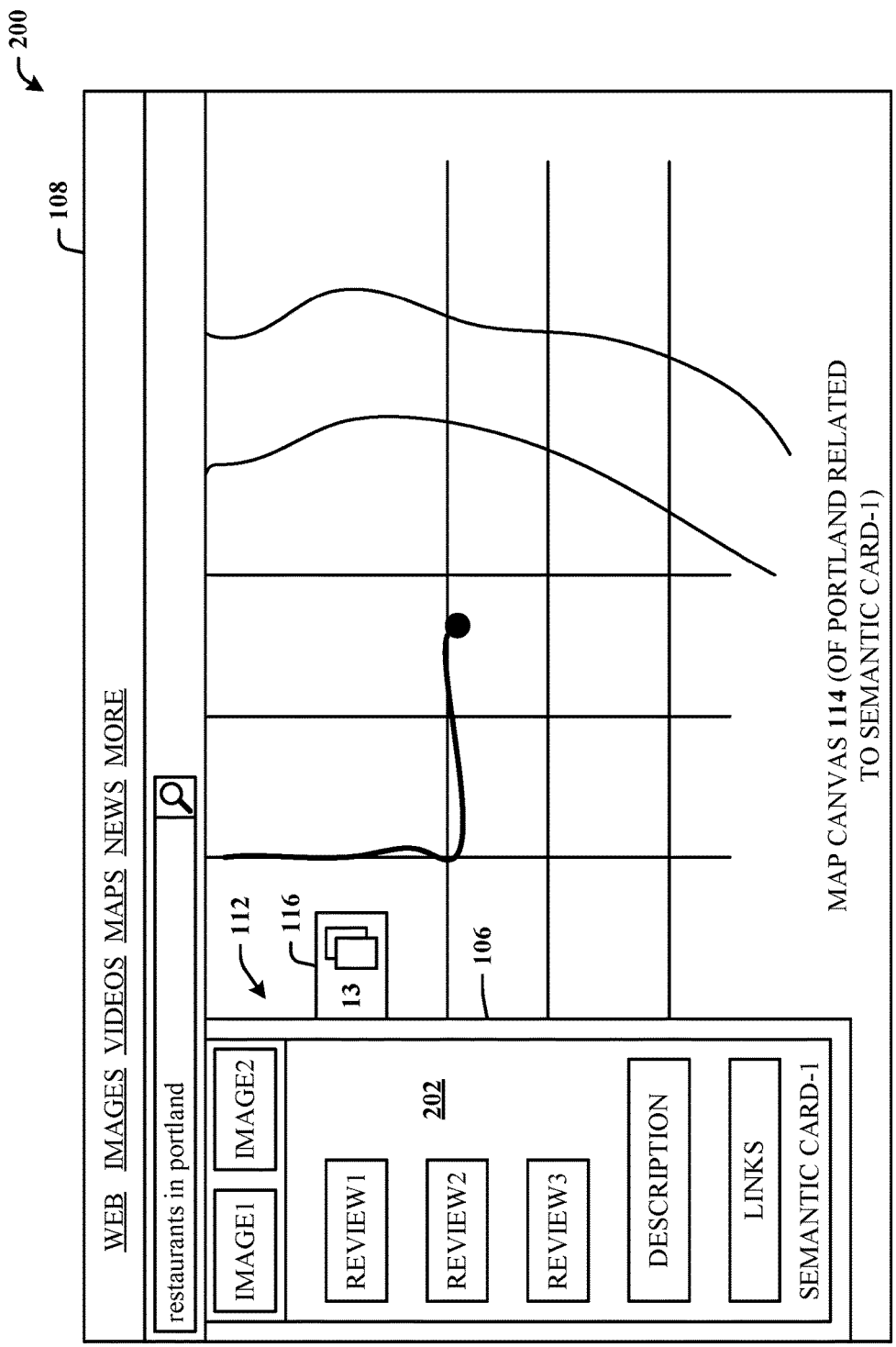
FIG. 2 illustrates a diagram of the map user interface depicting the semantic cards in the view of FIG. 1, and the affordance.

FIG. 2 illustrates a diagram 200 of the map user interface 108 depicting the semantic cards 104 in the view 112 of FIG. 1, and the affordance 116. Here, the map search is for "restaurants in Portland". The mapping UI 108 initially begins with the view 112 showing a single semantic card 202 and the annotated affordance 116 annotated with a count of "13" to indicate that a total of thirteen semantic cards have accumulated for this session. There can be a single search result associated with a single semantic card. The semantic card 202 can comprise one or more images (e.g., Image1, Image2, etc.) related to the search result, reviews (e.g., Review1, Review2, and Review3) input by users, and description section (Description) that provides a brief description of the result location, and links (Links), which can be links to social networks, other related categories of the search result for the semantic card 202, etc.

For the particular semantic card 202 in the card overlay 106, the mapping engine presents the related map canvas 114 of Portland related to the semantic card 202.

Figure 3:
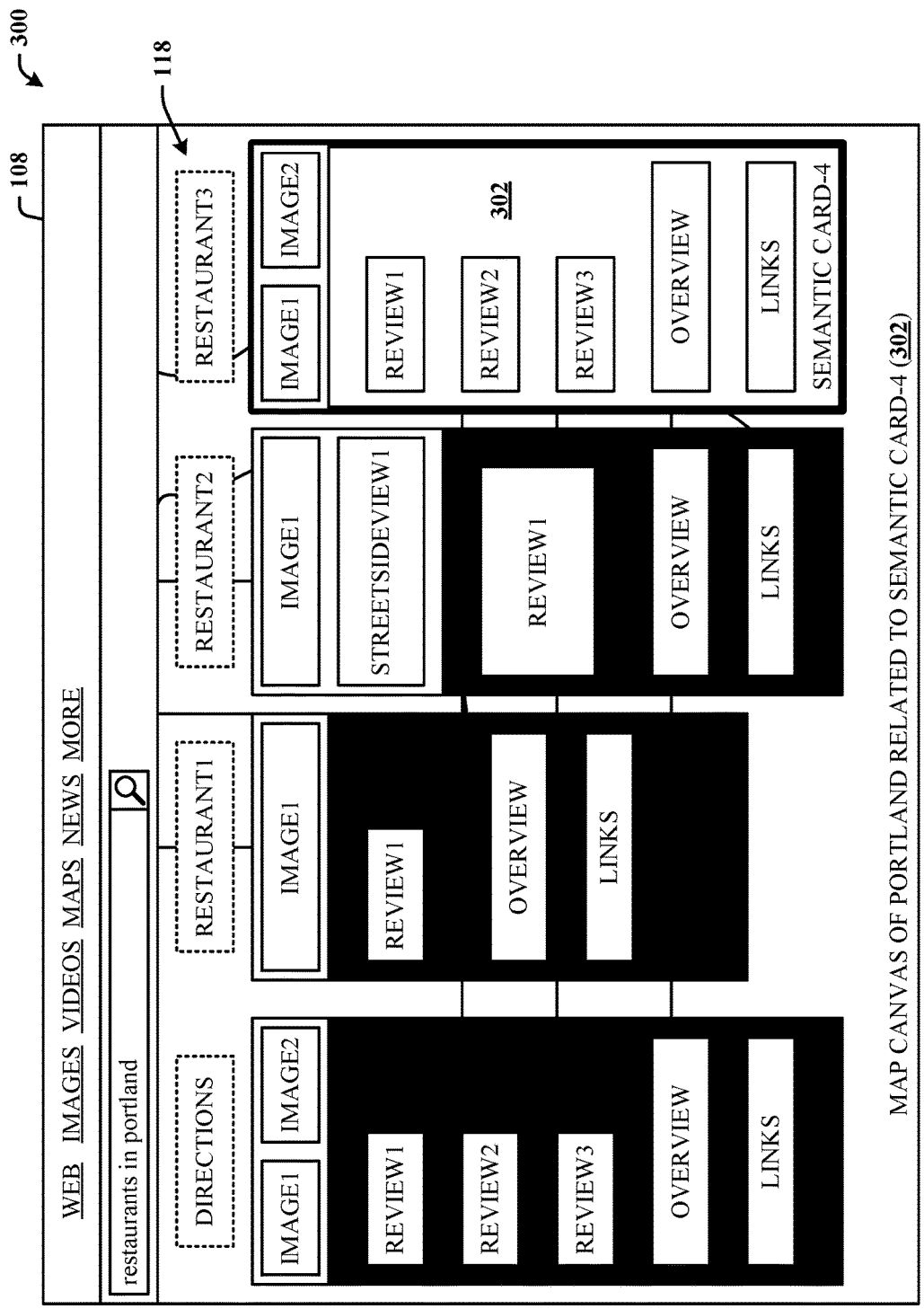
FIG. 3 illustrates a diagram of the map user interface depicting the semantic cards in the view of FIG. 1.

FIG. 3 illustrates a diagram 300 of the map user interface 108 depicting the semantic cards 104 in the view 118 of FIG. 1. With respect to the semantic representation of a card, visual parity and structure of the card are maintained from the search to the semantic view. Moreover, additional information is extracted as to how the cards are labeled. The semantic card content is an extension of the standard view of the content received in search. The card is essentially an informational query panel. Some or all cards can be made to persist the duration of the session. The semantic card represents bits of information/content that are extracted and consolidated into the card visual structure, and which enables navigation between the bits of information/content and the card view 118. The architecture extracts identification information (e.g., "Directions") from the card content and positions this identification information proximate (e.g., above) the card as a readily perceived visual identifier of the card.

Here, the view 118 makes available for viewing all thirteen cards, although only four of the thirteen semantic cards are shown due to display limitations. The UI 108 enables the user to scroll left and right (e.g., a touch-based swipe motion, an air gesture swipe motion, etc.) to view any of the semantic cards. Here, the user has selected a fourth semantic card 302 (denoted Semantic Card-4), which has visual (or graphical) emphasis applied (e.g., thick bordering) to indicate this card is the active or in-focus card, and the associated map canvas is shown under the card overlay. In order to view the underlying and associated map canvas, the user can then interact in some way (e.g., the same interactive affordance, another object designed for this purpose, gesture, command, etc.) to return from the overview mode of the card overlay to the stacked mode with the active or in-focus card on top of the stack in the card overlay.

Here the first semantic card (Semantic Card-1) relates to directions to a location, while the next three cards (Semantic Card-2, Semantic Card-3, and Semantic Card-4) relate to restaurants. Thus, it can be the case that the user wanted directions to the first restaurant (Restaurant1), and thus, the architecture generated the "Directions" card as part of the session. The user can then quickly return to the associated "Directions" map canvas by simply expanding the card overlay from the stacked mode to the overview mode, scroll to the "Directions" card, select the "Directions" card to bring it to the active or in-focus state, and the underlying map canvas is then retrieved and presented. The user can then view the map canvas once the card overlay is collapsed from the overview mode to the stacked mode.

In an alternative implementation, the user can configure the overview mode of the card overlay to only occupy (or consume) a part of the display area. For example, the overview mode may be configured to occupy a percentage (e.g., fifty percent) of the display area or UI area so the user can view the underlying canvas more clearly while scrolling and selecting one of the semantic cards.

Given that the semantic card retains a view (e.g., spatial organization, content organization, and/or structural dimensions) similar to the search environment, the user is able to more readily differentiate the card from other cards in the view 118. For example, the length of the Restaurant2 card is maintained so the user can more quickly identify it from the longer cards (e.g., Semantic Card-1, Semantic Card-3, etc.). It can be the case that a card is so long that the card bottom extends off the bottom of the page (out of view), in which case, the user is presented with a vertical scroll object that enables access of the out-of-view card information/content.

It can be the case that the cards can be ordered by language, such that a language normally read right-to-left can have the cards ordered in a right-to-left fashion. This capability can be provided and made user configurable for all languages, for example. The way in which the cards are oriented in the view 118 maintains correlation to the temporal aspects of the card creation during the session.

In yet another implementation, the card overlay comprises its own window in a side-by-side fashion with the underlying map canvas, which also is presented in its own window. Thus, the user can more effectively view the canvas while selecting the cards in the overview mode.

In yet another implementation, the canvas window can be configured to be a pop-up window that automatically appears in response to the selection of a card. In still another implementation, the card overlay is presented in a pop-up window over the canvas to provide increased display details of the canvas for the selected semantic card. These implementations can be made user-configurable and/or automatically computed by the device software based on the type of device and display area.

The disclosed architecture can optionally include a privacy component that enables the user to opt in or opt out of exposing information that may be considered personal such as searching content and data on a network. The privacy component enables the authorized and secure handling of user information, such as tracking information, as well as personal information that may have been obtained, is maintained, and/or is accessible. The user can be provided with notice of the collection of portions of the personal information and the opportunity to opt-in or opt-out of the collection process. Consent can take several forms. Opt-in consent can impose on the user to take an affirmative action before the data is collected. Alternatively, opt-out consent can impose on the user to take an affirmative action to prevent the collection of data before that data is collected.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
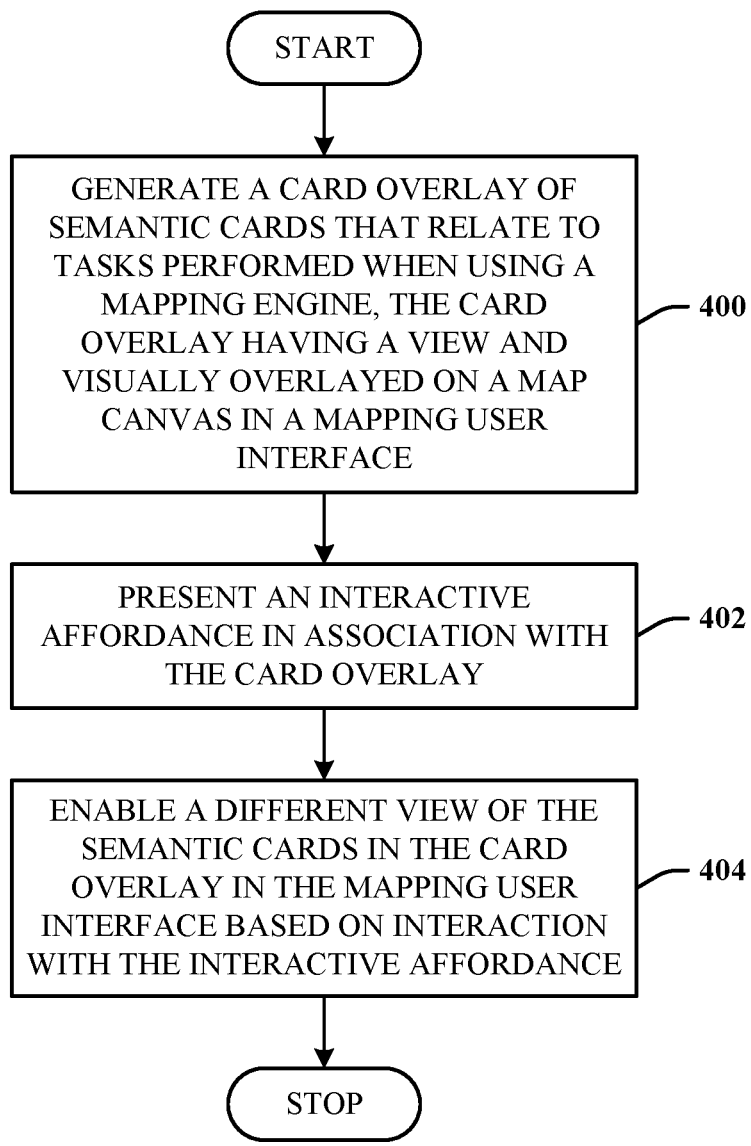
FIG. 4 illustrates a method in accordance with the disclosed architecture.

FIG. 4 illustrates a method in accordance with the disclosed architecture. At 400, a card overlay is generated of semantic cards that relate to tasks performed when using a mapping engine. The card overlay has a view (e.g., a stacked view or stacked mode view) and is visually overlayed (in the foreground) on a map canvas in a mapping user interface (e.g., used for finding entities of interest such as directions or locations of people, buildings, events, roads, etc.).

At 402, an interactive affordance (e.g., programmable object) is presented in association with the card overlay. The affordance can be annotated with information such as the card count while in the stacked mode. Alternatively, the affordance can be represented as a set of non-overlapping tabs each selectable by the user to bring the associated semantic card to the top of the stack. One of the tabs can enable the card overview mode. At 404, a different view (e.g., the overview mode) of the semantic cards in the card overlay is enabled in the mapping user interface based on interaction with the interactive affordance.

The method can further comprise enabling the view and the different view of the semantic cards generated on a per session basis. Thus, the session can comprise all the cards generated and associated canvases. The card will only be needed since the cards are linked to the canvases, which can be regenerated upon request (e.g., interaction) by selecting a specific card.

The method can further comprise pinning the card overlay on a side of the mapping user interface. This can be just one way of positioning the card overlay in the user interface. As previously indicated, the overlay can be in a pop-up window, for example, or in a separate window of multiple windows. Still alternatively, the stacked mode overlay can be a set of thumbnail images having identifying content that enables the user to understand and select the desired semantic card. Interaction with the affordance then transitions from the stacked mode to the overview mode with the semantic cards in expanded mode and card content in a readable and understandable zoom level.

The method can further comprise interacting with the interactive affordance to enable a global view (or overview) of the semantic cards as the different view. The method can further comprise applying graphical emphasis (also referred to a visual emphasis such a bolding, coloring, highlighting, etc.) to a semantic card to visually indicate the semantic card is an active card among multiple semantic cards being viewed. The method can further comprise selecting a semantic card and automatically changing the map canvas to correspond to the selected semantic card.

The method can further comprise presenting the semantic cards in the different view according to a prioritization technique. For example, the cards can be ranked according to some ranking metric, such as user intent, other user reviews, the current status (e.g., open, closed, etc.) of the entity of the card, check-in data, recency, weather conditions, popularity, social network data, and so on.

Figure 5:
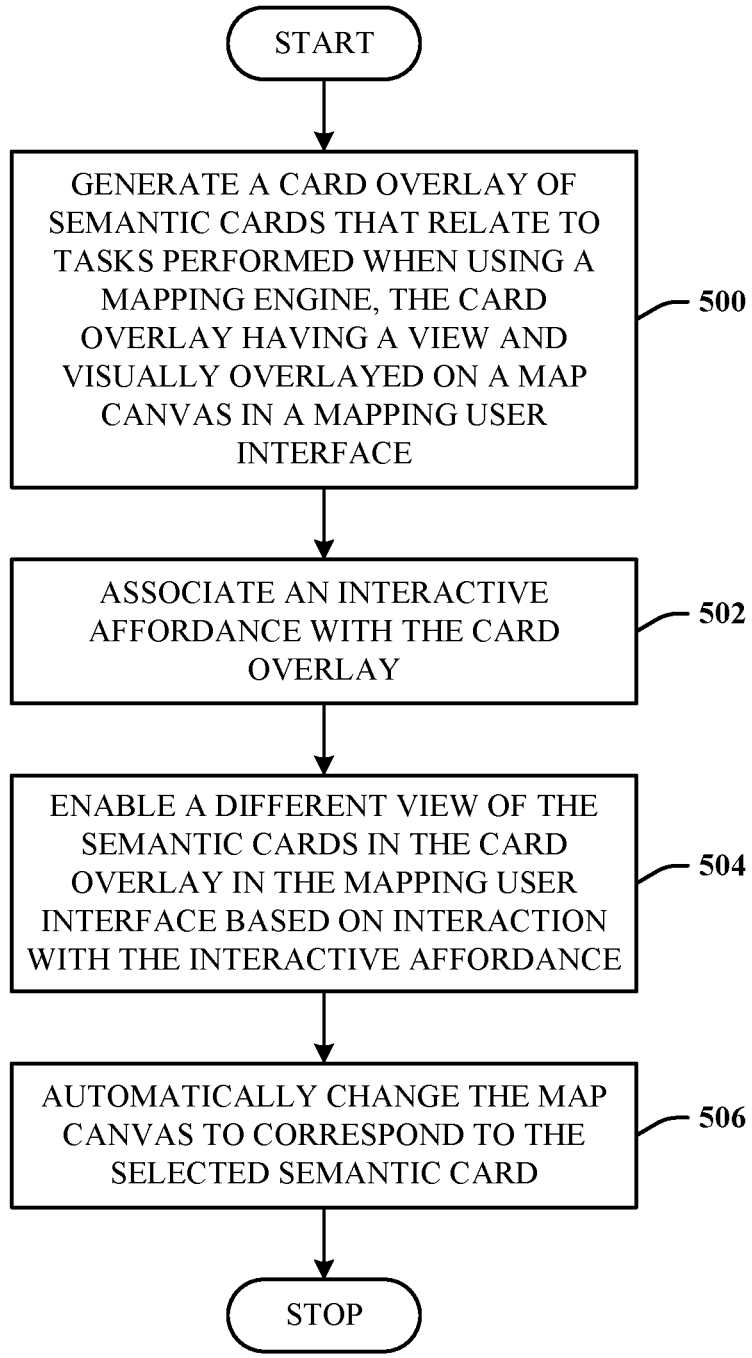
FIG. 5 illustrates an alternative method in accordance with the disclosed architecture.

FIG. 5 illustrates an alternative method in accordance with the disclosed architecture. The method can be implemented in a computer-readable storage medium comprising computer-executable instructions that when executed by a hardware processor, cause the processor to perform acts of the method.

At 500, generating a card overlay of semantic cards that relate to tasks performed when using a mapping engine, the card overlay having a view and visually overlayed on a map canvas in a mapping user interface. At 502, an interactive affordance is associated with (programmatically linked and activated) the card overlay. At 504, a different view of the semantic cards in the card overlay is enabled in the mapping user interface based on interaction with the interactive affordance. At 506, the map canvas is automatically changed to correspond to the selected semantic card.

The method can further comprise presenting the semantic cards in the different view according to a prioritization technique (e.g., recency). The method can further comprise bundling the semantic cards according to a session and sharing the session of semantic cards. The session can be defined according to application launch and closure, for example, or timeout of user activity associated with the application, and so on. In other words, the session can be defined by any parameters and/or actions the clearly indicate the start and end points.

The method can further comprise performing operations on a semantic card of the cards. These operations can include, but are not limited to, deleting a card, dragging a card to a different order among the cards, rotating a card, annotating a card, making more than one row of the cards, making separate windows for the cards and canvas, etc. The method can further comprise applying visual emphasis to an in-focus semantic card to indicate the semantic card is associated with the map canvas underlying the card overlay.

As used in this application, the terms "component" and "system" are intended to refer to a computer-related entity, either hardware, a combination of software and tangible hardware, software, or software in execution. For example, a component can be, but is not limited to, tangible components such as a microprocessor, chip memory, mass storage devices (e.g., optical drives, solid state drives, and/or magnetic storage media drives), and computers, and software components such as a process running on a microprocessor, an object, an executable, a data structure (stored in a volatile or a non-volatile storage medium), a module, a thread of execution, and/or a program.

By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 6:
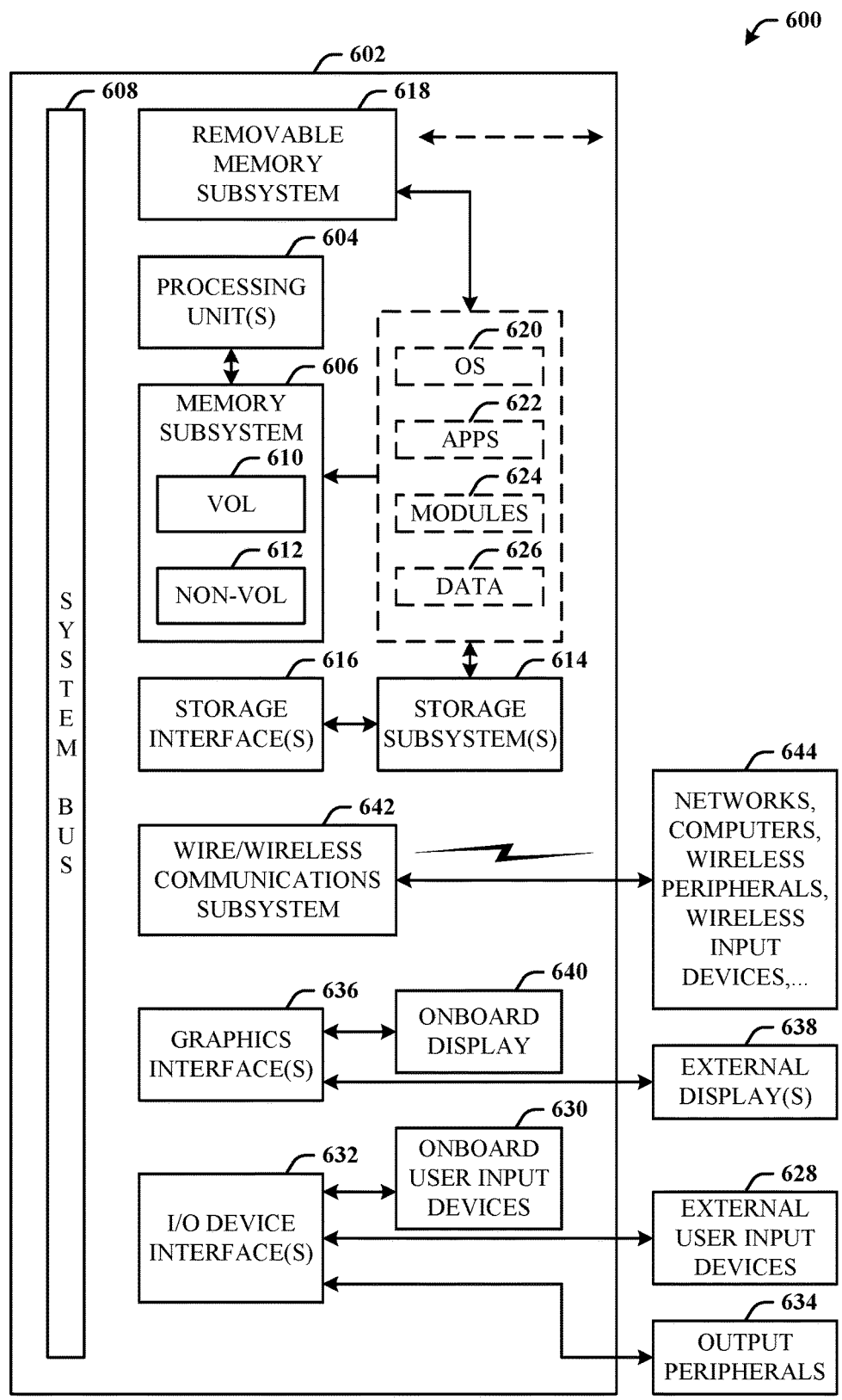
FIG. 6 illustrates a block diagram of a computing system that executes semantic card view in accordance with the disclosed architecture.

Referring now to FIG. 6, there is illustrated a block diagram of a computing system 600 that executes semantic card view in accordance with the disclosed architecture. However, it is appreciated that the some or all aspects of the disclosed methods and/or systems can be implemented as a system-on-a-chip, where analog, digital, mixed signals, and other functions are fabricated on a single chip substrate.

In order to provide additional context for various aspects thereof, FIG. 6 and the following description are intended to provide a brief, general description of the suitable computing system 600 in which the various aspects can be implemented. While the description above is in the general context of computer-executable instructions that can run on one or more computers, those skilled in the art will recognize that a novel implementation also can be implemented in combination with other program modules and/or as a combination of hardware and software.

The computing system 600 for implementing various aspects includes the computer 602 having microprocessing unit(s) 604 (also referred to as microprocessor(s) and processor(s)), a computer-readable storage medium such as a system memory 606 (computer readable storage medium/media also include magnetic disks, optical disks, solid state drives, external memory systems, and flash memory drives), and a system bus 608. The microprocessing unit(s) 604 can be any of various commercially available microprocessors such as single-processor, multi-processor, single-core units and multi-core units of processing and/or storage circuits.

Moreover, those skilled in the art will appreciate that the novel system and methods can be practiced with other computer system configurations, including minicomputers, mainframe computers, as well as personal computers (e.g., desktop, laptop, tablet PC, etc.), hand-held computing devices, microprocessor-based or programmable consumer electronics, and the like, each of which can be operatively coupled to one or more associated devices.

The computer 602 can be one of several computers employed in a datacenter and/or computing resources (hardware and/or software) in support of cloud computing services for portable and/or mobile computing systems such as wireless communications devices, cellular telephones, and other mobile-capable devices. Cloud computing services, include, but are not limited to, infrastructure as a service, platform as a service, software as a service, storage as a service, desktop as a service, data as a service, security as a service, and APIs (application program interfaces) as a service, for example.

The system memory 606 can include computer-readable storage (physical storage) medium such as a volatile (VOL) memory 610 (e.g., random access memory (RAM)) and a non-volatile memory (NON-VOL) 612 (e.g., ROM, EPROM, EEPROM, etc.). A basic input/output system (BIOS) can be stored in the non-volatile memory 612, and includes the basic routines that facilitate the communication of data and signals between components within the computer 602, such as during startup. The volatile memory 610 can also include a high-speed RAM such as static RAM for caching data.

The system bus 608 provides an interface for system components including, but not limited to, the system memory 606 to the microprocessing unit(s) 604. The system bus 608 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 602 further includes machine readable storage subsystem(s) 614 and storage interface(s) 616 for interfacing the storage subsystem(s) 614 to the system bus 608 and other desired computer components and circuits. The storage subsystem(s) 614 (physical storage media) can include one or more of a hard disk drive (HDD), a magnetic floppy disk drive (FDD), solid state drive (SSD), flash drives, and/or optical disk storage drive (e.g., a CD-ROM drive DVD drive), for example. The storage interface(s) 616 can include interface technologies such as EIDE, ATA, SATA, and IEEE 1394, for example.

One or more programs and data can be stored in the memory subsystem 606, a machine readable and removable memory subsystem 618 (e.g., flash drive form factor technology), and/or the storage subsystem(s) 614 (e.g., optical, magnetic, solid state), including an operating system 620, one or more application programs 622, other program modules 624, and program data 626.

The operating system 620, one or more application programs 622, other program modules 624, and/or program data 626 can include items and components of the system 100 of FIG. 1, items and components of the diagram 200 of FIG. 2, items and components of the diagram 300 of FIG. 3, and the methods represented by the flowcharts of FIGS. 4 and 5, for example.

Generally, programs include routines, methods, data structures, other software components, etc., that perform particular tasks, functions, or implement particular abstract data types. All or portions of the operating system 620, applications 622, modules 624, and/or data 626 can also be cached in memory such as the volatile memory 610 and/or non-volatile memory, for example. It is to be appreciated that the disclosed architecture can be implemented with various commercially available operating systems or combinations of operating systems (e.g., as virtual machines).

The storage subsystem(s) 614 and memory subsystems (606 and 618) serve as computer readable media for volatile and non-volatile storage of data, data structures, computer-executable instructions, and so on. Such instructions, when executed by a computer or other machine, can cause the computer or other machine to perform one or more acts of a method. Computer-executable instructions comprise, for example, instructions and data which cause a general purpose computer, special purpose computer, or special purpose microprocessor device(s) to perform a certain function or group of functions. The computer executable instructions may be, for example, binaries, intermediate format instructions such as assembly language, or even source code. The instructions to perform the acts can be stored on one medium, or could be stored across multiple media, so that the instructions appear collectively on the one or more computer-readable storage medium/media, regardless of whether all of the instructions are on the same media.

Computer readable storage media (medium) exclude (excludes) propagated signals per se, can be accessed by the computer 602, and include volatile and non-volatile internal and/or external media that is removable and/or non-removable. For the computer 602, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

A user can interact with the computer 602, programs, and data using external user input devices 628 such as a keyboard and a mouse, as well as by voice commands facilitated by speech recognition. Other external user input devices 628 can include a microphone, an IR (infrared) remote control, a joystick, a game pad, camera recognition systems, a stylus pen, touch screen, gesture systems (e.g., eye movement, body poses such as relate to hand(s), finger(s), arm(s), head, etc.), and the like. The user can interact with the computer 602, programs, and data using onboard user input devices 630 such a touchpad, microphone, keyboard, etc., where the computer 602 is a portable computer, for example.

These and other input devices are connected to the microprocessing unit(s) 604 through input/output (I/O) device interface(s) 632 via the system bus 608, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 632 also facilitate the use of output peripherals 634 such as printers, audio devices, camera devices, and so on, such as a sound card and/or onboard audio processing capability.

One or more graphics interface(s) 636 (also commonly referred to as a graphics processing unit (GPU)) provide graphics and video signals between the computer 602 and external display(s) 638 (e.g., LCD, plasma) and/or onboard displays 640 (e.g., for portable computer). The graphics interface(s) 636 can also be manufactured as part of the computer system board.

The computer 602 can operate in a networked environment (e.g., IP-based) using logical connections via a wired/wireless communications subsystem 642 to one or more networks and/or other computers. The other computers can include workstations, servers, routers, personal computers, microprocessor-based entertainment appliances, peer devices or other common network nodes, and typically include many or all of the elements described relative to the computer 602. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 602 connects to the network via a wired/wireless communication subsystem 642 (e.g., a network interface adapter, onboard transceiver subsystem, etc.) to communicate with wired/wireless networks, wired/wireless printers, wired/wireless input devices 644, and so on. The computer 602 can include a modem or other means for establishing communications over the network. In a networked environment, programs and data relative to the computer 602 can be stored in the remote memory/storage device, as is associated with a distributed system. It will be appreciated that the network connections shown are exemplary and other means of establishing a communications link between the computers can be used.

The computer 602 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related technology and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing device for providing search results in a map application, the mobile computing device comprising:

a mapping engine for generating a map user interface with a map canvas;

a card overlay component for presenting semantic cards in a card overlay of the map user interface, wherein the semantic cards relate to tasks performed during a session associated with the mapping engine, and wherein the card overlay is visually overlayed on the map canvas of the map user interface;

means for receiving a user selection to change a view of the card overlay that when selected enables a different view of the semantic cards in the card overlay of the map user interface.

2. The computing device of claim 1, wherein the semantic cards are represented in the view as a single semantic card and the affordance is annotated with a count of the semantic cards.

3. The computing device of claim 1, wherein the semantic cards are represented in the different view as an overview of individually viewable and selectable semantic cards.

4. The computing device of claim 1, wherein the semantic cards represented in the different view are arranged according to a recency with a most recent semantic card having an applied visual emphasis.

5. The computing device of claim 1, wherein the semantic cards represented in the different view are arranged by a category for comparison.

6. The computing device of claim 1, wherein the mapping engine changes the map canvas in response to a selection of a semantic card of the different view.

7. The computing device of claim 1, wherein the card overlay component enables storage and sharing of the semantic cards generated during the session.

8. The computing device of claim 1, wherein the semantic cards of the different view can be individually deleted.

9. A mobile computing device for providing search results in a map application, the mobile computing device comprising:

a processor;

memory storing computer‐readable instructions that when executed by the processor causes the mobile computing device to:

generate a card overlay of semantic cards that each relate to tasks performed within a map user interface, wherein the card overlay is visually overlayed on a map canvas in the map user interface;

receive a selection of an interactive affordance that is associated with the card overlay;

in response to receiving the selection of the interactive affordance, changing a view of the card overlay in the map user interface.

10. The mobile computing device of claim 9, further comprising computer‐readable instructions that when executed by the processor causes the mobile computing device to:

enable the view and a different view of the semantic cards generated on a per session basis.

11. The mobile computing device of claim 9, further comprising computer‐readable instructions that when executed by the processor causes the mobile computing device to:

pin the card overlay on a side of the map user interface.

12. The mobile computing device of claim 9, wherein changing the view of the card overlay in the map user interface further comprises computer‐readable instructions that when executed by the processor causes the mobile computing device to:

present a global view of the semantic cards.

13. The mobile computing device of claim 9, further comprising computer‐readable instructions that when executed by the processor causes the mobile computing device to:

apply a graphical emphasis to a semantic card to visually indicate the semantic card is an active card among multiple semantic cards being viewed.

14. The mobile computing device of claim 9, further comprising computer‐readable instructions that when executed by the processor causes the mobile computing device to:

select a semantic card and automatically change the map canvas to correspond to the selected semantic card.

15. The mobile computing device of claim 9, wherein changing the view of the card overlay in the map user interface further comprises computer‐readable instructions that when executed by the processor causes the mobile computing device to:

present the semantic cards according to a prioritization technique.

16. A method for providing searching results in a map application comprising:

generating a card overlay of semantic cards that each relate to tasks performed within a map user interface, wherein the card overlay is visually overlayed on a map canvas in the map user interface;

receiving a selection of an interactive affordance that is associated with the card overlay; and in response to receiving the selection of the interactive affordance, changing a view of the card overlay in the map user interface.

17. The method of claim 16, wherein changing the view further comprises presenting the semantic cards according to a prioritization technique.

18. The method of claim 16, further comprises bundling the semantic cards according to a session and sharing the session of semantic cards.

19. The method of claim 16, further comprises performing operations on a semantic card of the cards.

20. The method of claim 16, further comprises applying visual emphasis to an in-focus semantic card to indicate the semantic card is associated with the map canvas underlying the card overlay.

* * * * *